United States Patent

Sauer

[19]

[11] Patent Number: 6,023,235
[45] Date of Patent: Feb. 8, 2000

[54] METHOD FOR GENERATING MICROWAVE-RESOLUTION IMAGES OF MOVING OBJECTS BY INVERSE SYNTHETIC APERTURE RADAR

[75] Inventor: Thomas Sauer, Wessling, Germany

[73] Assignee: Deutsches Zentrum fur Luft-und Raumfahrt e.V., Benn, Germany

[21] Appl. No.: 09/090,940

[22] Filed: Jun. 5, 1998

[30] Foreign Application Priority Data

Jun. 5, 1997 [DE] Germany .......................... 197 23 685

[51] Int. Cl.[7] ....................................................... G01S 13/90
[52] U.S. Cl. ............................... 342/25; 342/36; 342/90; 342/175; 342/176; 342/192; 342/195; 342/196
[58] Field of Search ................................. 342/25, 33, 36, 342/37, 38, 39, 40, 175, 176, 179, 192, 193, 195, 196, 197, 89, 90, 104, 109, 110, 118, 134–136

[56] References Cited

U.S. PATENT DOCUMENTS

| | | | |
|---|---|---|---|
| 5,068,597 | 11/1991 | Silverstein et al. | 342/192 X |
| 5,164,730 | 11/1992 | Jain | 342/25 |
| 5,184,133 | 2/1993 | Tsao | 342/25 |
| 5,250,952 | 10/1993 | Roth | 342/25 |
| 5,343,204 | 8/1994 | Farmer et al. | 342/25 |
| 5,497,158 | 3/1996 | Schmid et al. | 342/25 X |
| 5,610,610 | 3/1997 | Hudson et al. | 342/25 |

FOREIGN PATENT DOCUMENTS 4406907 1/1995 Germany .......................... G01S 13/90

*Primary Examiner*—Bernarr E. Gregory
*Attorney, Agent, or Firm*—Browdy & Neimark

[57] ABSTRACT

A method of radar imaging moving objects, especially ground traffic at airports, uses inverse synthetic aperture radar (ISAR). The two-dimensional location distribution of backscatter centers of the object is detected. A plurality of range bins are provided for suppressing of interference, created because of Doppler shifts, in microwave images represented in the form of pixels. Only those pixels are considered to be active which exceed a defined intensity threshold value, which had previously been determined as a fixed fraction of the maximally present pixel intensity. A range area with interference is determined with the aid of a method wherein the threshold is exceeded and wherein the number of active pixels in the individual successive range bins is counted, and wherein image opening is performed in the detected interfered range area, which consists of a succession of a single or several repeated "erosions" and "dilatations". An erosion cancels all those active pixels, in whose defined vicinity an inactive pixel occurs, and a dilatation activates all pixels in the defined vicinity of an active pixel.

11 Claims, 10 Drawing Sheets

Fig.1a     Fig.1b
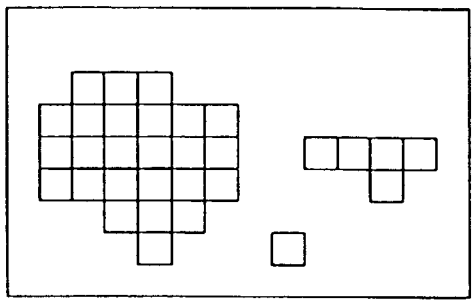   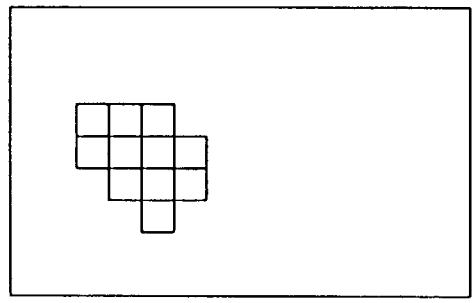
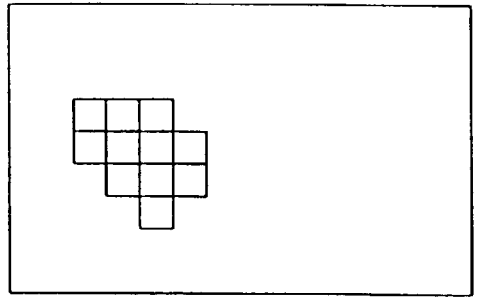   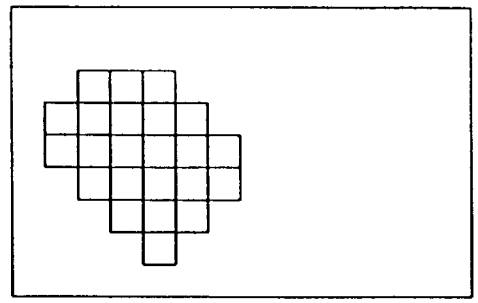
Fig.2a     Fig.2b

METHOD FOR GENERATING MICROWAVE-RESOLUTION IMAGES OF MOVING OBJECTS BY INVERSE SYNTHETIC APERTURE RADAR

FIELD OF THE INVENTION

The present invention relates to a method for generating an image, having resolution in the microwave range, of moving objects by means of the so-called inverse synthetic aperture radar (ISAR), by means of which the two-dimensional location distribution of the backscatter centers of the respective object is detected, in particular for monitoring ground traffic on airports, wherein a plurality of range lines are provided, in each of which a spectral analysis is performed for evaluating the Doppler shift, so that two-dimensional mapping of the reflectivity function of the object is obtained for all range lines.

REVIEW OF THE RELATED TECHNOLOGY

Such a method for classifying an object, using an inverse synthetic aperture radar (ISAR), is known from German Patent Publication 44 06 907 A1.

Using the principle of inverse synthetic aperture radar (ISAR), a fixed radar can generate an image of a moving object, which can be considered to be a kind of photograph. However, the resolution is not in the optical spectral range, but in the microwave range. This microwave image can be used as the basis for non-cooperative, i.e. without transponders, object detection.

A classifier based on microwave images of the localized objects is a component of a near range radar network (NRN), developed by the Applicant, which is used for monitoring ground traffic on airports.

The aim of the ISAR image principle is to detect the two-dimensional location distribution of radar scatterback centers of the object. With linearly moving targets, the image plane is defined by the radar line of sight (RLOS) and the velocity vector of the target. Along the radar line of sight the separation of the scatter centers takes place by means of the range resolution capability of the radar. Range resolution can be accomplished by, for example, the short pulse method or the phase modulation method.

For example, if the radar is near ground level and an airplane is moving over a runway, the image plane on which the airplane is pictured is horizontal.

If several scatter generators are located at different cross ranges in respect to the radar line of sight within a range bin, the radar signal back-scattered from this range bin is composed of several parts with a different Doppler shifts in accordance with the cross range of the scatter generators. It is therefore possible to detect the cross ranges of the respective scatter generators by means of a spectral analysis of chronologically-sequential signals received from a defined range. If this is performed for all range lines, two-dimensional mapping of the reflectivity function of the object is obtained.

But this only applies to a rigid object. In connection with an aircraft the turbine blades, rotors, or landing gear perform additional movements, so that further Doppler shifts of the received signal occur. However, these additional shifts are not correlated in any way with the cross range of these structures and therefore result interference and image distortion.

The following arrangements are known for suppressing the interfering portions of the signal. It can be expected of rapidly rotating rotors, in particular, that the spectral portion connected therewith lies far above the Doppler spectrum of the movement of the object. Low-pass filtering therefore could suppress this interference portion. But this would require that the received signal in all range bins would have to be sampled at a rate on the order of approximately 10 kHz, while the maximum sampling rate of actual systems is 300 Hz. Therefore the spectrum of an object performing a purely linear movement is also under-sampled. But this has no effect on imaging, as long as the sampling frequency still is twice the size of the bandwidth of the received signal. Only the information regarding the center of the spectrum is lost.

However, if there is an additional spectral range (for example, caused by the turbines), the two spectral portions overlap because of the under-sampling. In this case suppression of interference in the raw data is no longer possible.

If these data are processed in accordance with the ISAR algorithm then artifacts, i.e. interference portions, appear in the resulting microwave images. In range lines containing signals of rotating structures, arbitrarily distributed back-scatter centers will be indicated.

A radar provides a range profile of the observed area, i.e. the reflectivity as a function of the distance of the scatterers from the radar. In a digital system this range profile is discrete, one sample or cell is called range bin.

When range profiles of the same area with a fixed antenna (as in the ISAR system) are produced, these time-consecutive profiles can be arranged in form of a matrix. A column of this matrix is a range profile, and a line of this matrix is called range line. Thus, a range line consists of range bins, which have the same distance, but which were sampled at different times.

Because of this arbitrary distribution it might be assumed that the artifacts are not stable and should fluctuate greatly between images which follow each other rapidly in time, while the other reflection values do not change. However, the artifacts show the same behavior in respect to their cross range position and their reflectivity, both in the amount and in phase, as the actual object portions; so that neither incoherent nor coherent averaging of chronologically-sequential microwave images can suppress the artifacts.

Because of the above-described difficulties, a solution of the problem sketched above does not appear to be possible by means of conventional signal processing methods. If microwave images are to be used as the starting point for a classification, erroneous classifications must be expected when, with corresponding aspect angles, the radar looks into the engines or at the landing gear.

SUMMARY OF THE INVENTION

Accordingly, the present invention has an object, among others, to overcome deficiencies in the prior art such as noted above.

The present invention has the object of indicating steps in connection with a method for generating an image, in the microwave range, of moving objects by means of the so-called inverse synthetic aperture radar (ISAR). The present invention suppresses image interferences which are created because of further Doppler shifts caused, for example by turbine blades, rotors, or landing gear. In connection with an application for monitoring the ground traffic in airports, the method in accordance with the invention avoids erroneous evaluations, and in particular prevents erroneous classifications which would occur if at a corresponding aspect angle the radar would be aimed into the engines or on the landing gear.

In accordance with the invention, this object is attained by a method for generating in the microwave range an image of moving objects by means of inverse synthetic aperture radar (ISAR), as is explained in detail below.

BRIEF DESCRIPTION OF THE DRAWINGS

The above and other objects and the nature and advantages of the present invention will become more apparent from the following detailed description of an embodiment taken in conjunction with drawings, wherein:

FIGS. 1a and 1b are graphical views of an image from a large coherent structure of a linear structure and a single pixel, wherein so-called erosion is applied;

FIGS. 2a and 2b are similar to FIGS. 1a and 1b but illustrate the application of so-called dilatation, wherein the initial image in FIG. 2a corresponds to that in FIG. 1b;

in FIG. 4a prior to the suppression process and in FIG. 4b after the suppression process;

in FIG. 5a prior to the suppression process and in FIG. 5b after the suppression process;

in FIG. 6a prior to the suppression process and in FIG. 6b after the suppression process;

in FIG. 7a prior to the suppression process and in FIG. 7b after the suppression process.

DETAILED DESCRIPTION OF THE PREFERRED EMBODIMENT

Figure 3:
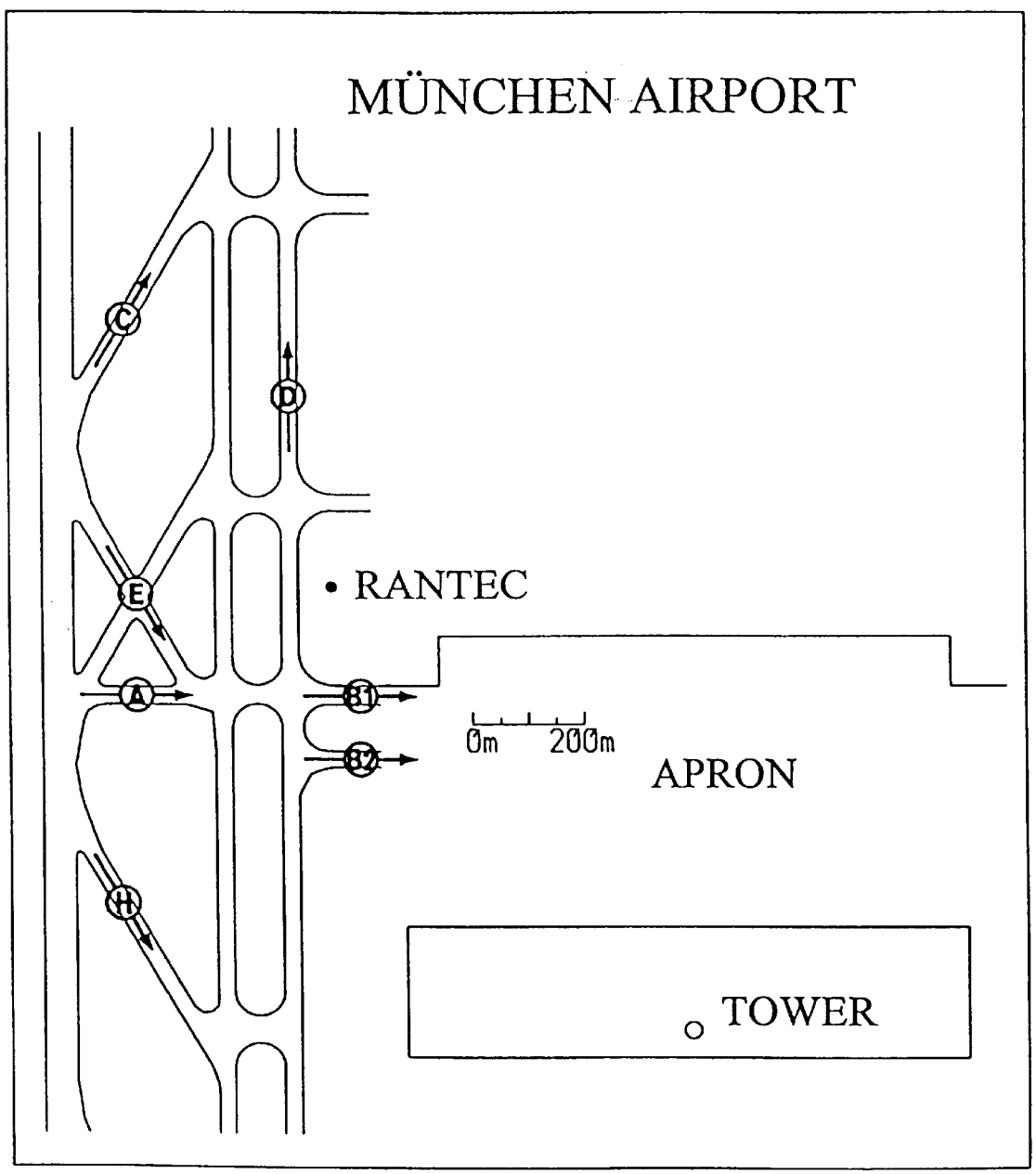
FIG. 3 is a plan view of various measuring positions in the airport of München (Munich), Germany.

In microwave images in which artifacts occur the interferences can differ in shape from the actual object elements. The latter mostly form coherent structures, while interferences occur more in spots.

It is now possible to employ morphological operations from digital image processing. This will first be explained by means of a binary image. A scenario, selected as the starting point, consists of a large coherent structure, a linear structure, and an individual pixel. An example of such a scenario is represented in FIG. 1a.

So-called "erosion" was applied to the scenario represented in FIG. 1a. This operation cancels all pixels in whose quadruple neighborhood (i.e. left, right, above or below) an inactive pixel occurs. By means of this the edge of the larger structure is cut down and the smaller pixels disappear completely, as can be seen in FIG. 1b.

This result (FIG. 2a) is now used as the initial image for a so-called "dilatation", which also is a part of the morphological operations. Here all pixels in a quadruple neighborhood of an active pixel are activated. The edge of the structure is magnified by this, which is represented in FIG. 2b.

Two things become clear from this example. For one, the dilatation operation is not the reverse of an erosion operation. Erosion followed by dilatation leads to the suppression of small image structures, while larger ones remain unaffected to a large degree. This operation is also called the "opening" of an image.

The invention applies the method for opening an image, along with a number of modifications and expansions, to microwave images. Since microwave images represent gray value images with a continuous intensity distribution, a threshold value is required which permits a classification of pixels as "active or inactive".

Furthermore, the so-called opening of an image is to be used only in the image areas with interference, which are mostly located in the center of the aircraft. This assures that individual objects acting as scattering generators, for example at the nose or the wing tips, are not obliterated. Since there are more active pixels in the range lines with interference than in the other ones, these pixels can be automatically detected by a counting method.

After detection the image is opened in this area, and in the opening the number of erosion steps and of dilatation steps can also be greater than one; however, the number of steps should be equal in both stages. With erosion, the cancellation of a pixel is achieved by setting the intensity value to zero. With dilatation, the reactivation of a pixel is achieved by restoring the original intensity. This means that the initial image must be stored in the meantime.

The suppression algorithm developed in accordance with the present invention therefore reads as follows:

a. An intensity threshold value $S_1=f_1 I_{max}$ is determined as a fraction of the maximum pixel intensity $I_{max}$, wherein the threshold value coefficient is identified by $f_1$. Here, all pixels of an intensity I>S are considered to be active.

b. To determine the distance area with interference, a search for the first range line whose portion of active pixels exceeds a threshold $S_z$; this represents the start of the area with interference.

c. Starting with the last range line, a search for a line is now made whose portion of active pixels exceeds a threshold $S_z$; this now represents the end or the area with interference.

d. The area of interference is respectively increased by two (2) lines upward and downward; that is, the area is broadened.

e. The so-called opening algorithm in the interfered area is performed in that the erosion is repeated n times, and a modified dilatation is repeated n times.

This method was applied to a number of microwave images of passenger aircraft, which stem from a measuring operation which had been performed in the summer of 1995 on the München airport. In this case the raw data were recorded by means of a short-pulse radar RANTEC, which was operated at a transmitting frequency of 9 GHz with horizontal polarization of the transmitter and receiver. The respective length of the transmission pulses was 14 ns, which resulted in a resolution in the range direction of 2.1 m. In the process profiles were prepared of the distance area of interest, through which the aircraft rolled. The repetition rate of these distance profiles was between 50 Hz and 200 Hz. Strongly bundling parabolic antennas were used to manually track the rolling aircraft during the length of the measurement (30 s). Stationary targets in time-consecutive range bins (=range line) were suppressed by high-pass filtering. In order to achieve a resolution in the cross range, respectively 256 successive distance profiles were processed in accordance with the principle of the above described inverse synthetic aperture radars (ISAR) for objects moving in a straight line. The apparent object rotations seen by the radar lay in the range between 1° and 4.5°.

Since at the selected aspect angle the radar looked into the turbines, or respectively on the landing gear during the measuring operation, additional Doppler shifts occurred, which are noticed as artifacts in the microwave images. The various measuring positions A, B1, B2, C, D, E and H taken up during the measuring operation in the summer of 1995 are represented in FIG. 3. However, afterwards (FIGS. 4a to 7b), only microwave images of aircraft at the positions A, D and E are represented. The following parameters were used for the above recited suppression method: f=0.01, $S_2$=0.1 and n=1.

Figure 4A:
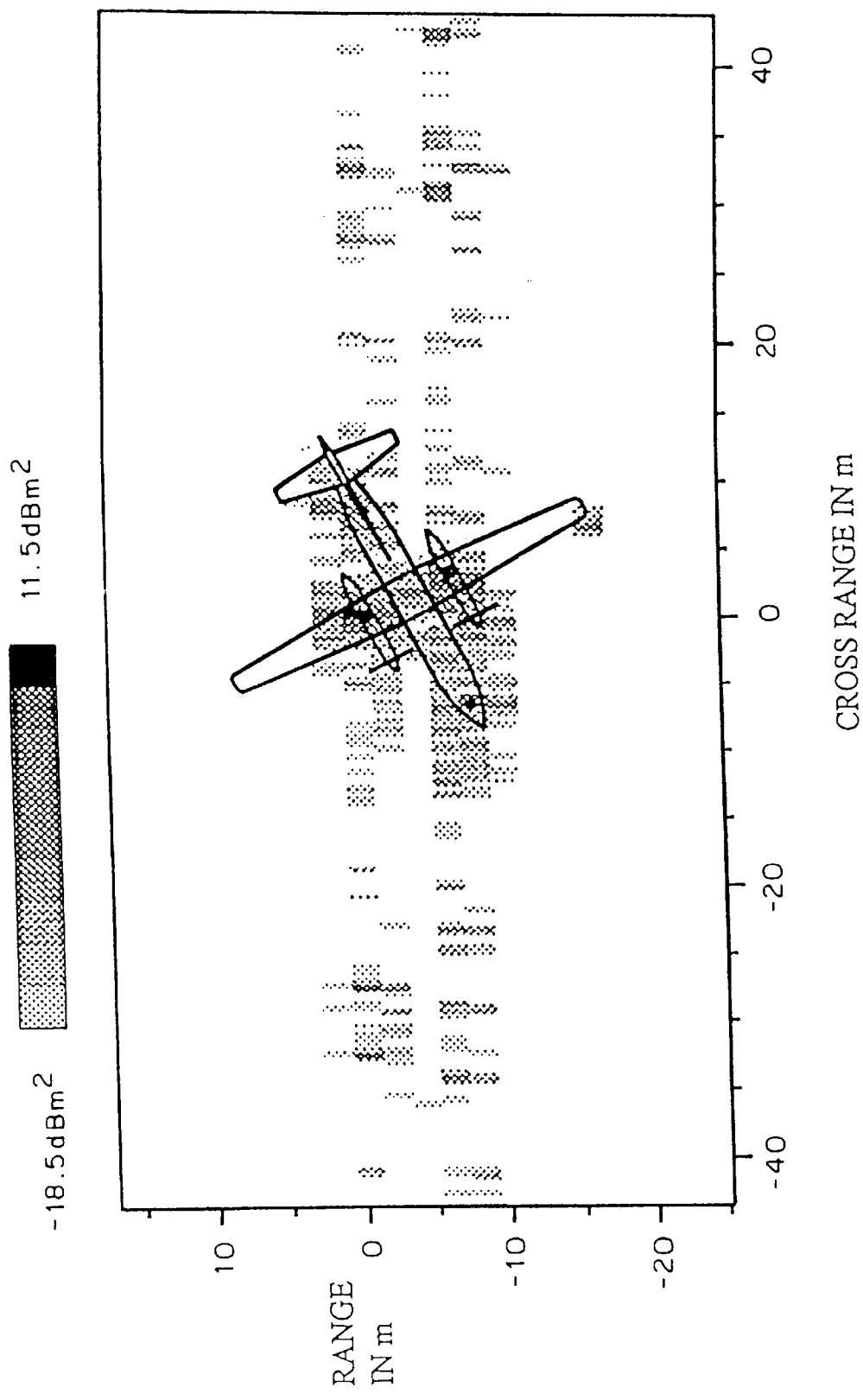
FIGS. 4a and 4b are microwave images of a Fokker 50 airplane surveyed in position E.
Figure 4B:
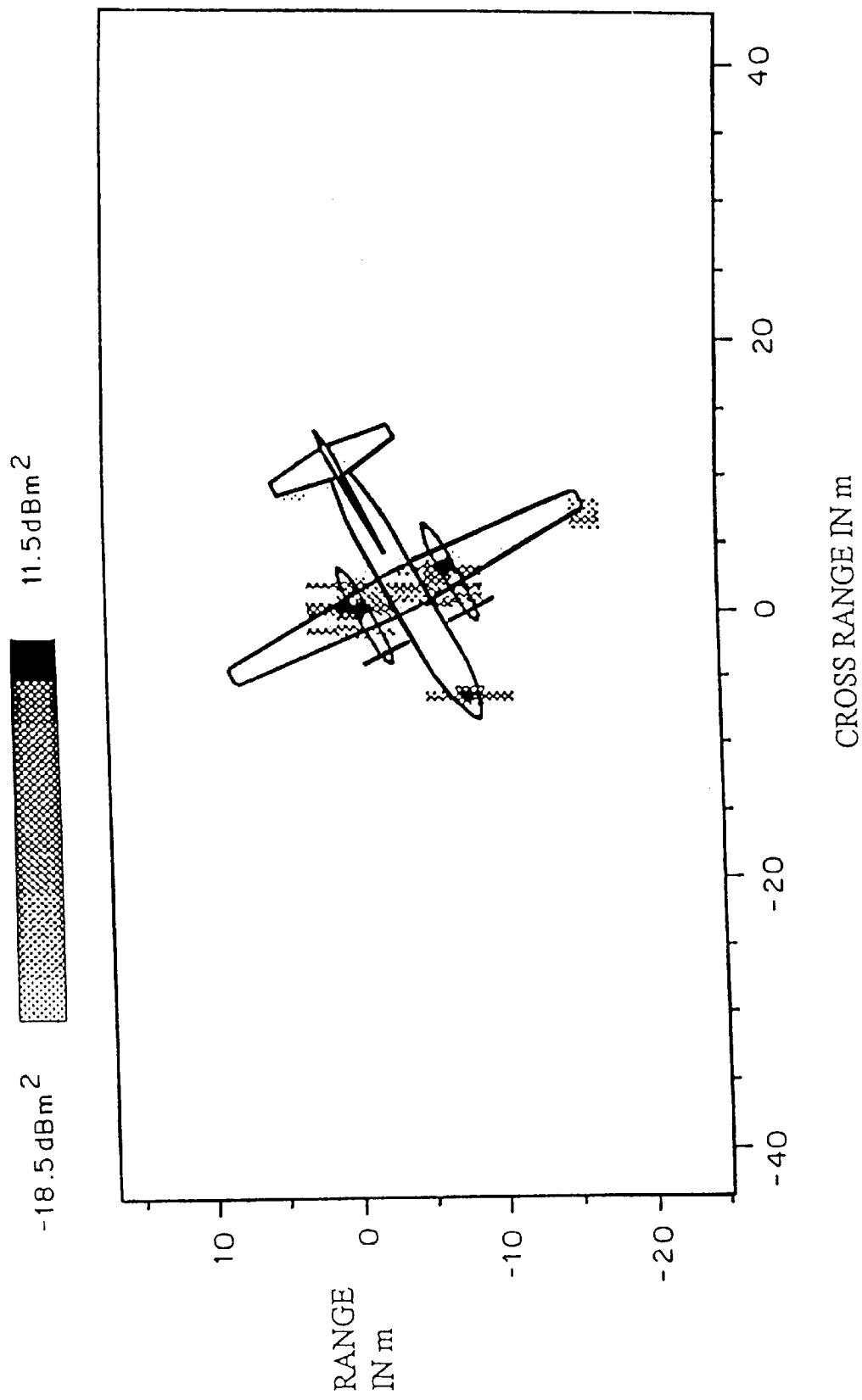

FIGS. 4a and 4b show a propeller aircraft of the Fokker 50 type, which rolled in the direction toward the apron in position E at a distance of 350 m from the radar. If in this example the opening algorithm were to be applied to the complete image, the individual scatter generators at the left wing tip would be destroyed by the erosion. But if a localization to the automatically detected interference area is made, this structure remains.

Figure 5A:
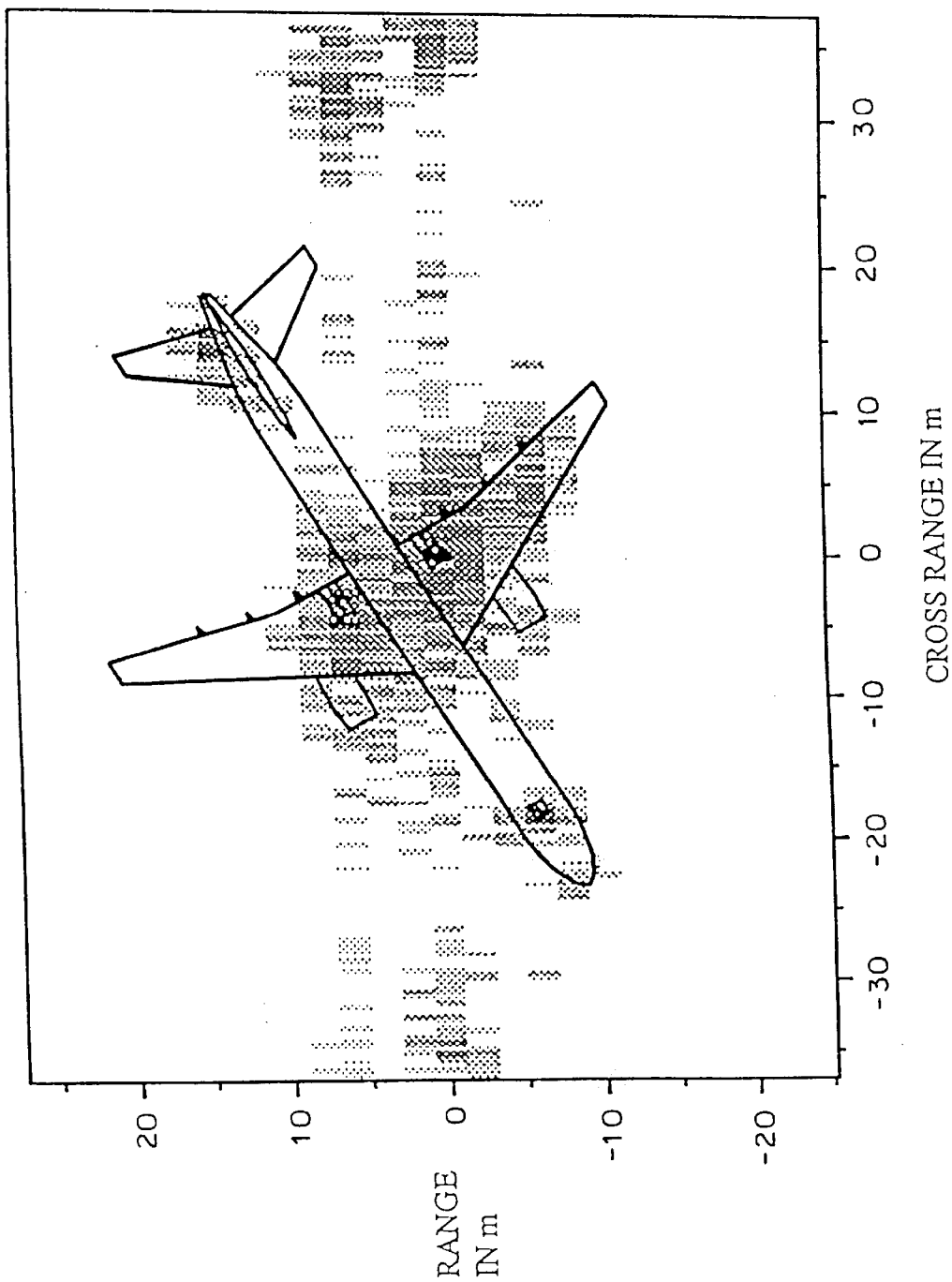
FIGS. 5a and 5b are microwave images of a B-757 airplane surveyed in position E of FIG. 3.
Figure 5B:
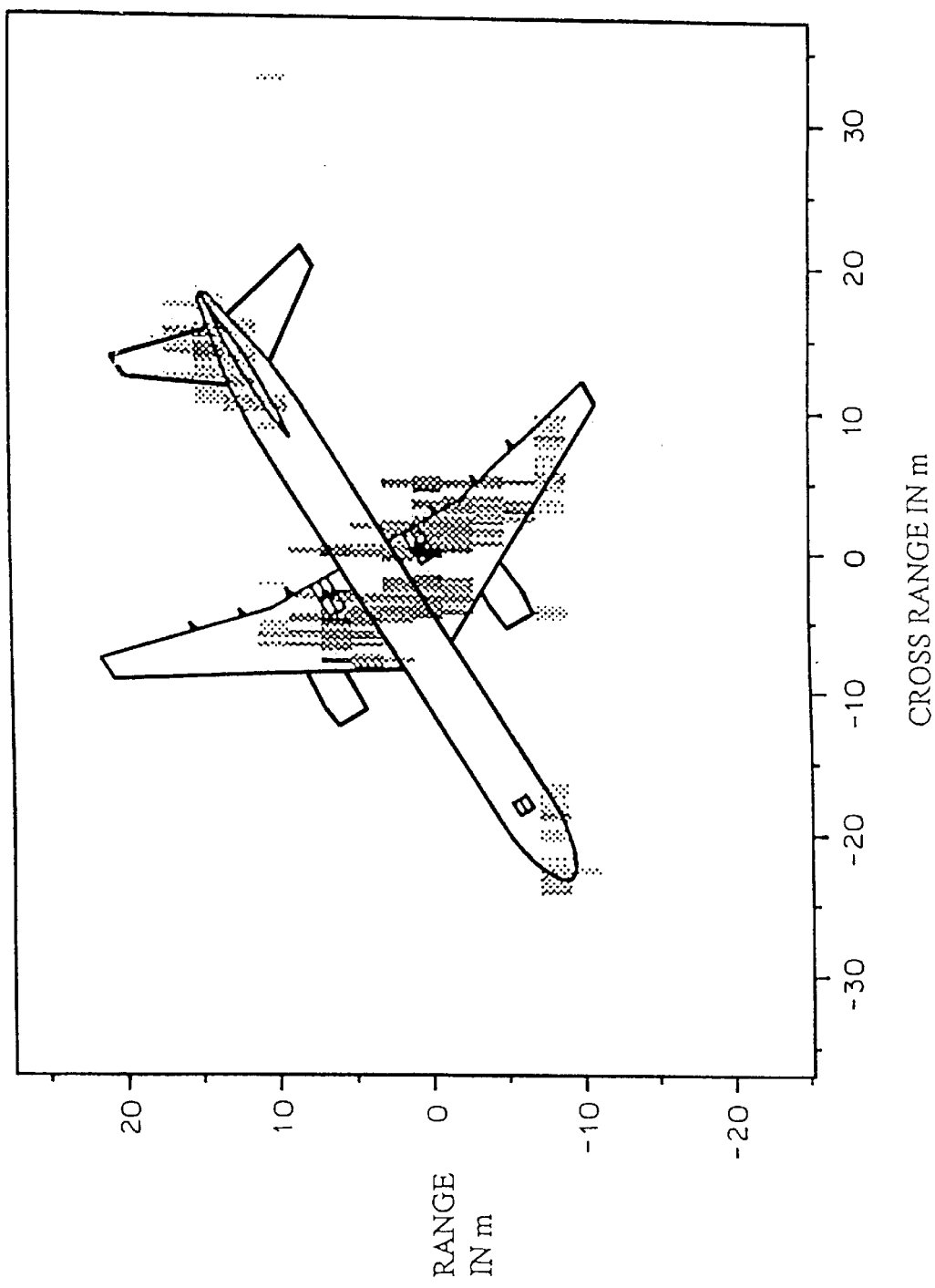
Figure 6A:
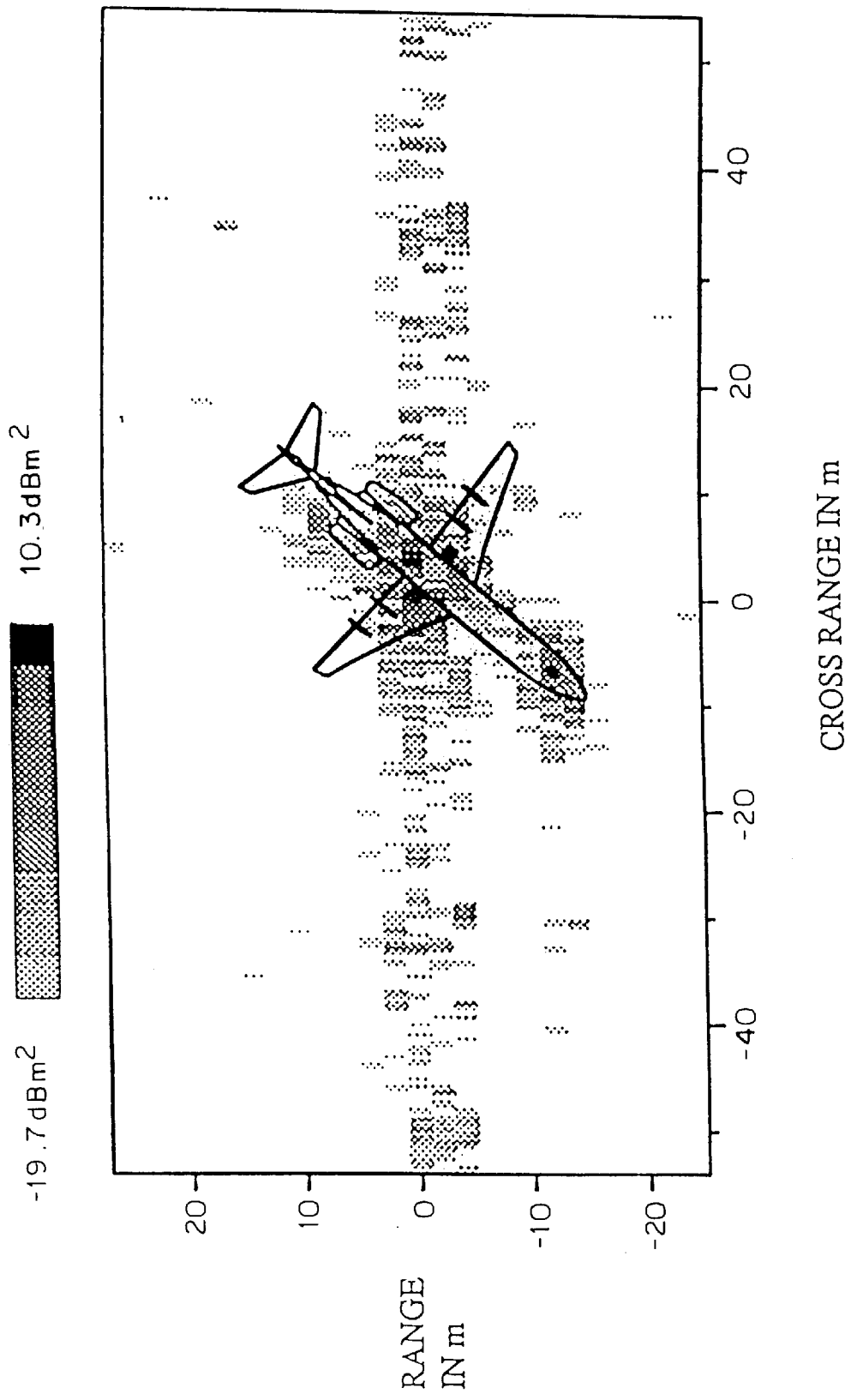
FIGS. 6a and 6b are microwave images of a Fokker 100 surveyed in position A of FIG. 3.
Figure 6B:
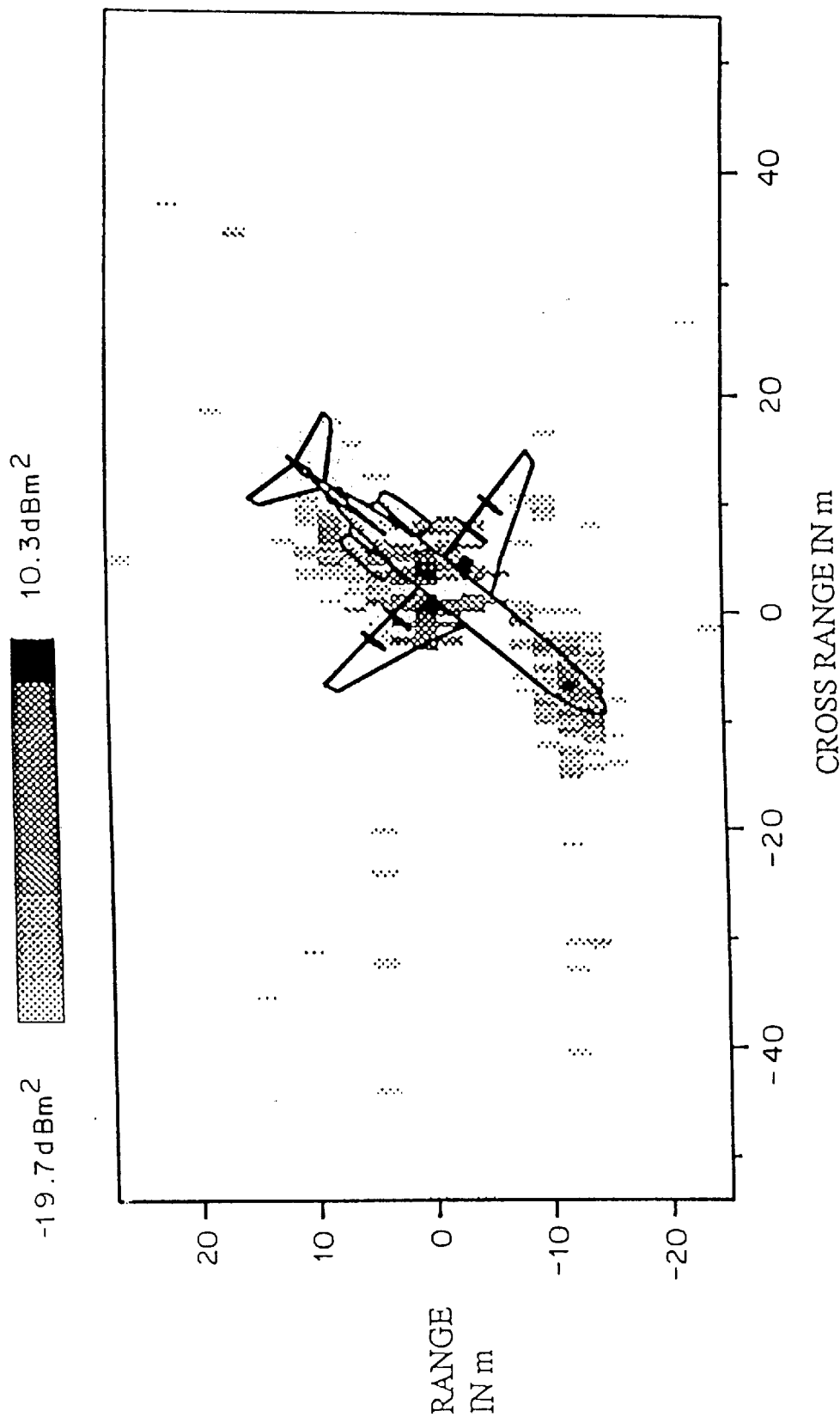
Figure 7A:
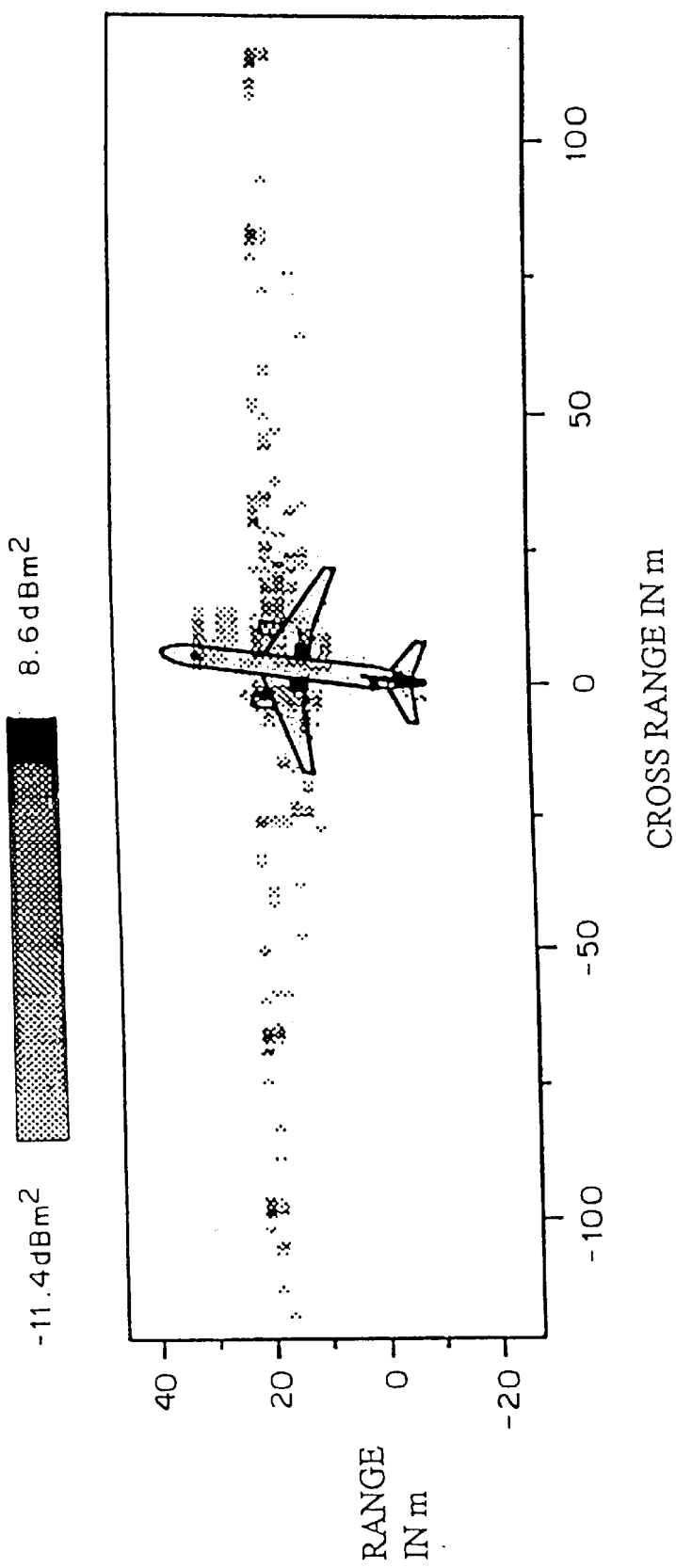
FIGS. 7a and 7b are, respectively, microwave images of a B-757 surveyed in position D of FIG. 3)
Figure 7B:
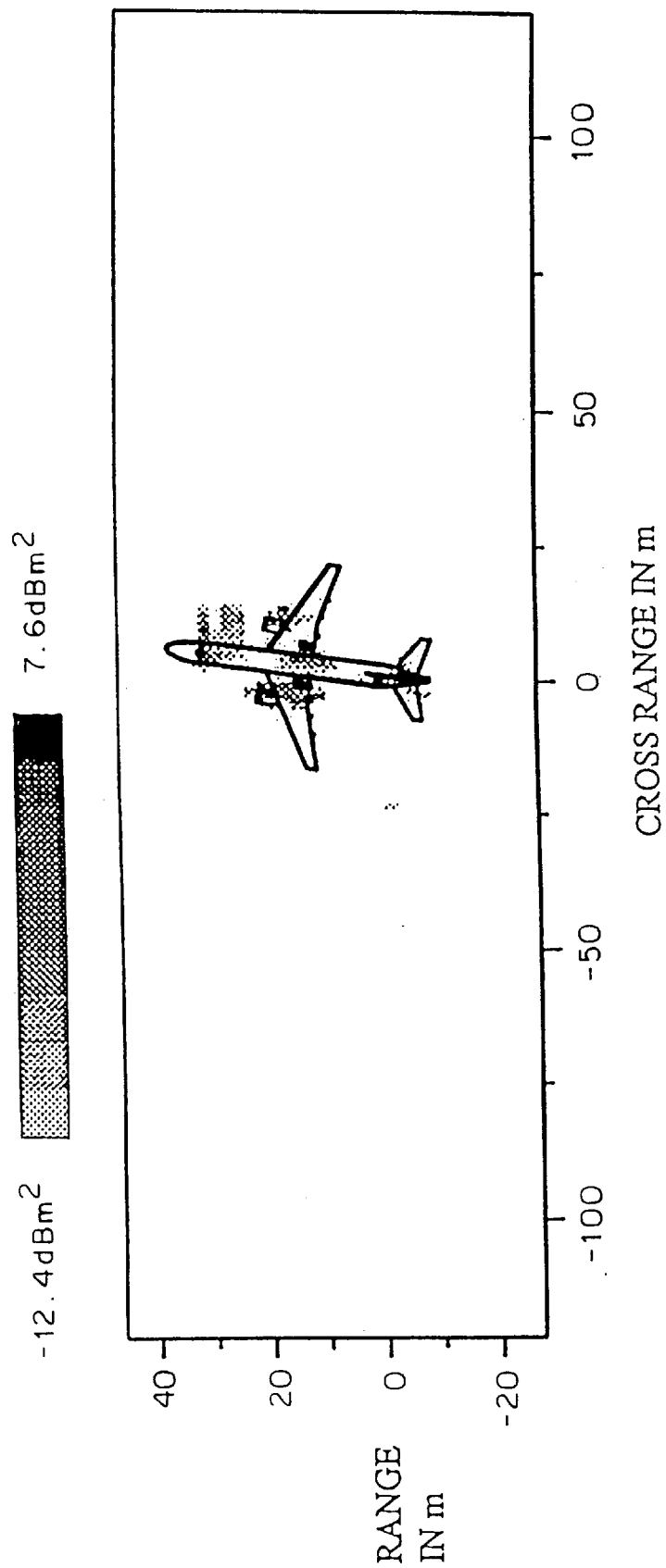

Corresponding results were also obtained in connection with the microwave images of the aircraft surveyed at positions D and E. Here, FIG. 5a shows a microwave image of an aircraft of the B-757 type surveyed at the position E, namely in FIG. 5a prior to applying the suppression method and in FIG. 5b after the application of the suppression method. FIGS. 6a and 6b respectively show microwave images of an aircraft of the Fokker 100 type surveyed in position A, namely in FIG. 6a prior to applying the suppression method and in FIG. 6b after the suppression method. Finally, microwave images of an aircraft of the B-757 type surveyed in position D are represented in FIGS. 7a and 7b, namely in FIG. 7a prior to an application of the suppression method and in FIG. 7b after the application of the suppression method.

These microwave images taken at the various positions not only clearly prove the usefulness, but in particular the efficiency of the method in accordance with the invention.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation, The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A method for generating a microwave image of a moving object by using inverse synthetic aperture radar (ISAR) to detect backscatter centers of the object, comprising:

providing a two-dimensional location distribution of a plurality of range lines;

performing a spectral analysis in each of the range lines for evaluating a Doppler shift, wherein a two dimensional mapping of a reflectivity function of the object is obtained for all of the range lines; and suppressing interference in the microwave image, the interference including artifact pixels created because of Doppler shifts; the step of suppressing further comprising:

(a) identifying pixels which exceed an intensity threshold value as active pixels, and subjecting only the active pixels to further processing;

(b) counting respective numbers of active pixels in individual successive range lines, determining range lines wherein the numbers of active pixels exceed a numerical threshold, and determining at least one interfered range area comprising the range lines wherein the numbers of active pixels exceed the numerical threshold and to which further processing is to be restricted;

(c) performing image opening in the interfered range area, the image opening further comprising successively performing at least one erosion and at least one dilatation;

wherein the erosion comprises canceling each active pixel in a defined vicinity of which an inactive pixel occurs, and the dilatation comprises activating each pixel in the defined vicinity of which an active pixel occurs;

and wherein, following any erosion or any dilatation, the defined vicinity of each pixel is freshly determined by applying the same defined vicinity criteria as before the respective erosion or dilatation, whereby a previously performed image processing step has no effect at all on the new vicinity determination.

2. The method in accordance with claim 1, wherein the step of determining at least one interfered range area further comprises:

searching in a first direction along the range axis for a first range line having a proportion of active pixels exceeding the numerical threshold, and thereafter searching in an opposite second direction along the range axis for a second range line having the proportion of active pixels exceeding the numerical threshold.

3. The method in accordance with claim 2, wherein the interfered range area is expanded by at least one line in the first direction and in the second direction.

4. The method in accordance with claim 3, wherein the interfered range area is expanded by two lines in the first direction and in the second direction.

5. The method in accordance with claim 1, wherein the step of performing image opening in the interfered range area further comprises successively performing a plurality of erosions and corresponding dilatations.

6. The method in accordance with claim 1, wherein the erosion step of canceling each active pixel in a defined vicinity of which an inactive pixel occurs comprises setting an intensity value of the active pixel to zero.

7. The method in accordance with claim 1, wherein in the dilatation step of activating each pixel in the defined vicinity of which an active pixel occurs comprises restoring an original intensity.

8. The method in accordance with claim 7, comprising a step of storing the original intensity.

9. The method in accordance with claim 1, wherein the image opening further comprises using a quadruple neighborhood of an active pixel wherein four pixels located to the left, right, top and bottom thereof are considered.

10. The method according to claim 1, wherein the threshold value is a predetermined fixed fraction of the maximally present pixel intensity.

11. The method according to claim 1, wherein the use includes monitoring ground traffic in an airport.

* * * * *